S. JUNE.
Chain Fence and Gate.

No. 216,417.   Patented June 10, 1879.

Attest:
S. J. Parker.
Thomas Morse.

Inventor.
Solomon June.

UNITED STATES PATENT OFFICE.

SOLOMON JUNE, OF ITHACA, NEW YORK, ASSIGNOR OF ONE-HALF HIS RIGHT TO THOMAS J. McELHENY, OF SAME PLACE.

IMPROVEMENT IN CHAIN FENCE AND GATE.

Specification forming part of Letters Patent No. 216,417, dated June 10, 1879; application filed December 19, 1878.

*To all whom it may concern:*

Be it known that I, SOLOMON JUNE, of Ithaca, Tompkins county, New York, have invented an Improved Chain Fence and Gate, of which the following is a specification, reference being had to the accompanying drawings.

My object is to make gates and a fence out of chains; and in the accomplishment of this I construct gates at the ordinary or established roadway, and also provide gates at places not commonly used, which can be opened in times of harvest, or when occasions render it desirable to do so, and with especial reference to the convenience of farm and other uses; and I make the fence part out of the same chains and connecting-rods that I use in the gates.

Figure 1:
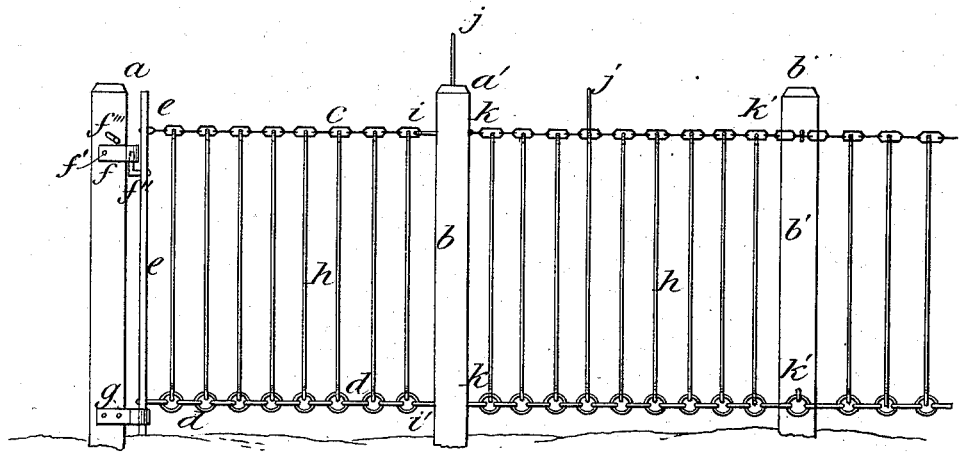
Figure 2:
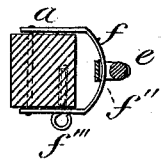
Figure 3:
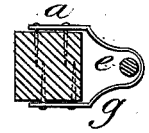

Figure 1 is a portion of a line of my fence, and shows in the left-hand panel or space, between two posts, a roadway or commonly-used gate, such as I use for all regular gates, and the middle length or panel or space a fixed portion or length of fence, not designed to be used for a gate or gateway; and it is a sample of the construction of all lengths or panels, as they are secured to any number of posts in the line of the fence, and I use or make gates similar to those shown in the first panel or space at any desirable intervals or points, which are designed to be opened only as convenience requires their use. Fig. 2 is a section of a latch-post of a gate, looking down on the latch or fastening. Fig. 3 shows the socket at the base of the same post.

In the figures, $a$ is the post for the latch, or to which an established or commonly-used gate is fastened for a regular roadway, and $a'$ is the hinge-post of the same. Other posts, $a\ b\ b'$, &c., make up the line of the fence; and they are ordinary posts, of the full height of the fence, set in the ground by any ordinary method of setting posts in general use. The space between the posts $a'$ and $b$ is shown as occupied by the chains and metallic rods that constitute the gates and which make the line of fence proper. These lengths of panels of fence thus shown contain all that I use to construct my gated fence.

It will be seen that there are two chains—$c$ the upper chain, and $d$ the lower chain; that these chains extend the whole length of the fence, and serve as the stringers or rails of the fence, and are severed only at the gates; that these chains are connected by upright rods of iron, $h$, which rods have loops or links made on each of their ends, by which they link into the links of the chains at regular intervals, as shown; that the only other upright parts are the posts and the gate-bars $e$, soon to be spoken of; that the chains and linked connecting-rods may be made of any desirable length, and rolled up as an article of manufacture, ready for transportation and sale, adapted for use as fence-panels or for gates in the fence thus made.

To make fence lengths or panels, the chains are fastened to the posts by staples driven into the posts, as shown in the middle panel or length of Fig. 1.

To make regular gates, I prefer the hinge-ends of the chains $c$ and $d$—namely, the right-hand ends, as seen in Fig. 1—to be connected by strong eyes or staples to the hinge-post $a'$; but the staples used in the usual fastenings of the chains to the posts may be made to serve as hinges for the hinge-ends of the chains, and thus make the hinge attachment. To the left-hand ends of the chains, as seen in Fig. 1, next to the post $a$, I fasten a special rod or bar, that I call the "gate-bar," (marked $e$,) and this gate-bar $e$ holds the chains firmly at the same distance apart as the rods $h$ are long. The gate-bar is made longer than the rods $h$ at its upper end, to serve as a handle in opening and closing the gate, and it reaches below the lower chain, to serve as a bolt or projection to go into the lower gate-socket. Toward the upper end of the gate-bar there is made fast a hook, $f'''$, which hook is used as a latch-hook in opening and closing the gate by lifting out of it or putting into it the latch-hinged strap or socket $f$. This socket is a strap of iron, and is hinged at its ends to the post $a$, as shown, and reaches to the hook $f''$, so as to just go into the said hook, when the chains and their connecting-rods are drawn tighter across the opening of the gateway, thus closing and fastening the gate. At the bottom of the post $a$ there is seen another socket or loop of iron, $g$, similar to the upper socket. It is not hinged, but made fast to the post. Its use is to hold the lower end of the gate-bar when put into it; and, of course, when the upper strap, socket, or latch is lifted out of the hook fast to the gate-bar, and the gate-bar is lifted out of the lower fixed strap or socket, the chains are loosened, and the gate is opened by the carrying of the chains and their attached rods to the post $a'$, and hanging them—that is, the chain-gate thus made—on the pins $j$ or $j'$. A pin, $f'''$, is put in over the hinged socket $f'$ to prevent accidental lifting of the socket.

The chain-gate I have described may be thrown down on the ground at the foot of the post $a'$, and so of corresponding posts at other places, instead of being hung on the pins $j$ or $j'$. Reversing the process of opening closes the gates—that is, the gate is taken up off of the ground or off of the pins $j$ or $j'$, and carried toward the post $a$, when the chains, becoming more tightened, are made tight and fast by putting the lower end of the gate-bar $e$ into the lower strap or socket, and then lifting the upper socket or latch. This socket is let down into the hook, Fig. 2, and thus the gate is closed and fastened.

I claim—

1. In the described chain-fence, the combination of the chains $c$ and $d$ and the uprights $h$, the said uprights being metallic rods, with links on each of their ends, which are linked into the links of the chains $c$ and $d$ at intervals suited to a fence, as shown, and which chains and uprights are made fast to and are used in combination with the posts $a$ $a'$, &c., of the fence, as set forth.

2. The gate described, made of the chains $c$ and $d$ and uprights $h$, the said uprights having links on each of their ends, which are linked into the links of the chains, as shown, and the said parts being combined with and used with the gate-bar $e$, movable socket $f$, and fixed socket $g$, as specified.

SOLOMON JUNE.

Witnesses:
S. J. PARKER,
E. D. SMITH.